(12) United States Patent
Seligsohn et al.

(10) Patent No.: US 7,844,218 B2
(45) Date of Patent: *Nov. 30, 2010

(54) SUB-ORBITAL, HIGH ALTITUDE COMMUNICATIONS SYSTEM

(75) Inventors: Sherwin I. Seligsohn, Narberth, PA (US); Scott Seligsohn, Bala Cynwyd, PA (US)

(73) Assignee: International Multi-Media Corporation, Narberth, PA (US)

( * ) Notice: Subject to any disclaimer, the term of this patent is extended or adjusted under 35 U.S.C. 154(b) by 920 days.

This patent is subject to a terminal disclaimer.

(21) Appl. No.: 11/211,041

(22) Filed: Aug. 23, 2005

(65) Prior Publication Data

US 2006/0003698 A1    Jan. 5, 2006

Related U.S. Application Data

(63) Continuation of application No. 10/180,892, filed on Jun. 25, 2002, now abandoned, which is a continuation of application No. 09/340,260, filed on Jun. 30, 1999, now abandoned, which is a continuation of application No. 08/929,752, filed on Sep. 15, 1997, now abandoned, which is a continuation of application No. 08/661,836, filed on Jun. 11, 1996, now abandoned, which is a continuation of application No. 08/100,037, filed on Jul. 30, 1993, now abandoned.

(51) Int. Cl.
*H04B 7/15* (2006.01)
(52) U.S. Cl. .......................... 455/11.1; 455/7; 370/315; 370/316; 244/31
(58) Field of Classification Search .............. 455/7, 455/11.1, 12.1, 13.1, 427, 431; 370/316, 370/315; 244/31, 32
See application file for complete search history.

(56) References Cited

U.S. PATENT DOCUMENTS

| | | | |
|---|---|---|---|
| 651,361 A | 6/1900 | Kitsee |
| 744,936 A | 11/1903 | Plecher |
| 1,296,687 A | 3/1919 | Nichols |
| 1,650,461 A | 11/1927 | Nilson |
| 2,151,336 A | 3/1939 | Scharlau |
| 2,462,102 A | 2/1949 | Istvan |
| 2,542,823 A | 2/1951 | Lyle |

(Continued)

FOREIGN PATENT DOCUMENTS

DE         1 923 744         11/1970

(Continued)

OTHER PUBLICATIONS

George Gilder, *From Wires to Waves*, Forbes ASAP, Jun. 5, 1995, pp. 125-141.

(Continued)

*Primary Examiner*—Raymond S Dean
(74) *Attorney, Agent, or Firm*—Kenyon & Kenyon LLP

(57) ABSTRACT

A sub-orbital, high altitude communications system that has at least two ground stations and at least one high altitude relay station. Each of the ground stations includes apparatus for sending and receiving telecommunications signals. The relay stations include apparatus for receiving and sending telecommunications signals from and to the ground stations and from and to other relay stations. Apparatus is provided for controlling the lateral and vertical movement of the relay stations so that a predetermined altitude and location of each of the relay stations can be achieved and maintained. Apparatus is provided for retrieving relay stations so that they can be serviced for reuse.

10 Claims, 4 Drawing Sheets

U.S. PATENT DOCUMENTS

| | | | |
|---|---|---|---|
| 2,598,064 A | 5/1952 | Lindenblad | |
| 2,626,348 A | 1/1953 | Nobles | |
| 2,627,021 A | 1/1953 | Hansell et al. | |
| 2,740,598 A | 4/1956 | Van Krevelen | |
| 2,748,266 A | 5/1956 | Boyd | |
| 2,886,263 A | 5/1959 | Ferguson | |
| 3,030,500 A | 4/1962 | Katzin | |
| 3,045,952 A | 7/1962 | Underwood | |
| 3,114,517 A | 12/1963 | Brown et al. | |
| 3,119,578 A | 1/1964 | Borgeson et al. | |
| 3,146,976 A | 9/1964 | Houdou | |
| 3,153,878 A | 10/1964 | Smith, Jr. | |
| 3,193,223 A | 7/1965 | Davis | |
| 3,260,017 A | 7/1966 | Wolfe | |
| 3,302,906 A * | 2/1967 | Winker | 244/32 |
| 3,390,851 A * | 7/1968 | Mann | 244/32 |
| 3,614,031 A | 10/1971 | Demboski | |
| 3,663,762 A | 5/1972 | Joel, Jr. | |
| 3,742,358 A * | 6/1973 | Cesaro | 455/9 |
| 3,746,282 A * | 7/1973 | Vorachek | 244/31 |
| 3,906,166 A | 9/1975 | Cooper et al. | |
| 3,971,454 A | 7/1976 | Waterbury | |
| 4,042,192 A | 8/1977 | Walter | |
| 4,073,516 A * | 2/1978 | Kling | 290/55 |
| 4,174,082 A | 11/1979 | Eshoo | |
| 4,204,656 A | 5/1980 | Seward, III | |
| 4,236,234 A | 11/1980 | McDavid et al. | |
| 4,262,864 A * | 4/1981 | Eshoo | 244/31 |
| 4,364,532 A | 12/1982 | Stark | |
| 4,368,415 A * | 1/1983 | Henderson et al. | 322/2 R |
| 4,402,475 A * | 9/1983 | Pavlecka | 244/96 |
| 4,402,476 A | 9/1983 | Wiederkehr | |
| 4,651,956 A | 3/1987 | Winker et al. | |
| 4,686,322 A * | 8/1987 | Kujas | 136/245 |
| 4,709,884 A | 12/1987 | Gustafson | |
| 4,711,416 A | 12/1987 | Regipa | |
| 4,729,750 A | 3/1988 | Prusman | |
| 4,928,317 A | 5/1990 | Franchini | |
| 4,955,562 A | 9/1990 | Martin et al. | |
| 4,986,494 A | 1/1991 | Tockert | |
| 4,995,572 A | 2/1991 | Piasecki | |
| 5,089,055 A * | 2/1992 | Nakamura | 136/248 |
| 5,186,414 A | 2/1993 | Holzschuh et al. | |
| 5,186,418 A | 2/1993 | Lauritsen | |
| 5,206,882 A | 4/1993 | Schloemer | |
| 5,268,694 A | 12/1993 | Jan et al. | |
| 5,285,208 A | 2/1994 | Bertiger et al. | |
| 5,294,076 A | 3/1994 | Colting | |
| 5,379,320 A | 1/1995 | Fernandes et al. | |
| 5,386,953 A | 2/1995 | Stuart | |
| 5,448,623 A | 9/1995 | Wiedeman et al. | |
| 5,479,397 A | 12/1995 | Lee | |
| 5,519,761 A | 5/1996 | Gilhousen | |
| 5,559,865 A | 9/1996 | Gilhousen | |
| 5,678,783 A | 10/1997 | Wong | |
| 5,949,766 A | 9/1999 | Ibanez-Meier et al. | |
| 5,982,337 A | 11/1999 | Newman et al. | |
| 6,151,308 A | 11/2000 | Ibanez-Meier et al. | |
| 6,167,263 A | 12/2000 | Campbell | |
| 6,324,398 B1 | 11/2001 | Lanzerotti et al. | |
| 6,374,080 B2 | 4/2002 | Uchida | |
| 6,756,937 B1 | 6/2004 | Chang et al. | |
| 7,313,362 B1 | 12/2007 | Sainct | |
| 7,567,779 B2 * | 7/2009 | Seligsohn et al. | 455/12.1 |

FOREIGN PATENT DOCUMENTS

| | | | |
|---|---|---|---|
| DE | 40 09 772 | | 10/1991 |
| EP | 0 119 841 | | 9/1984 |
| EP | 0 371 529 | | 6/1990 |
| EP | 0 536 921 | | 4/1993 |
| EP | 0 639 035 | | 2/1995 |
| FR | 2 077 798 | | 10/1973 |
| FR | 2 282 366 | | 3/1976 |
| FR | 2 408 228 | | 1/1979 |
| FR | 2 539 383 | | 5/1985 |
| FR | 2 561 719 | | 9/1985 |
| FR | 2 622 754 | | 5/1989 |
| FR | 2 669 455 | | 5/1992 |
| FR | 2 673 418 | | 9/1992 |
| GB | 2 027 403 | | 2/1980 |
| GB | 2 051 247 | | 1/1981 |
| GB | 1 591 902 | | 7/1981 |
| GB | 2137051 | | 9/1984 |
| GB | 2137051 A | * | 9/1984 |
| GB | 2196919 | | 5/1988 |
| GB | 2 281 014 | | 2/1995 |
| JP | 51 6609 | | 1/1976 |
| JP | 53 148907 | | 12/1978 |
| JP | 1 180129 | | 7/1988 |
| JP | 3 104426 | | 5/1991 |
| JP | 4 286975 | | 10/1992 |
| JP | 4 355522 | | 12/1992 |
| JP | 5 063829 | | 3/1993 |
| JP | 6 104865 | | 4/1994 |
| JP | 4 96528 | | 11/1996 |
| PL | 38345 | | 3/1955 |
| WO | WO 95/10145 | | 4/1995 |
| WO | WO 97/07609 | | 2/1997 |
| WO | WO 97/15992 | | 5/1997 |
| WO | WO 97/33790 | | 9/1997 |
| WO | WO 97/34449 | | 9/1997 |
| WO | WO 98/51568 | | 11/1998 |

OTHER PUBLICATIONS

Mark Dzlatklewics, *Smart Antennas Transmit Savings*. Jan. 15, 1995, pp. 83-84.

Found on the Internet: http://mathworld.com/StandardDeviation.html, *Probability and Statistics*, May 28, 2003, pp. 1-12.

Found on the Internet: http://www.spirentcom.com/documents/159.pdf, *Emulating RF Channel Characteristics*, May 27, 2003, pp. 1-10.

Found on the Internet: http://www.tpub.com/neets/book11/46c.htm, *Antenna Arrays*, May 27, 2003, pp. 1-7 and 1-2.

Found on the Internet: http://www.ee.surrey.ac.uk/Personal/D.Jefferies/pantarray.html, *Antenna Arrays*, May 27, 2003, pp. 1-12.

Brown et al., *Balloon Technology Offers High-Altitude Applications*, Aviation Week & Space Technology, Nov. 16, 1992, pp. 56-57 (translation provided).

Found On the Internet: http://www.electronicstimes.com/story/OEG20030408S0042, *Intel Helps Found WiMAX Broadband Wireless Forum*, Semiconductor Business News, Apr. 8, 2003.

Dr. Philip C. Koenig, Communications, Surveillance, and Cargo: *Some Current Directions and Programs in Airship Design and Development*, Office of Naval Research Int'l Field Office, Aug. 21, 2001, pp. 1-2.

*Airships to Complement Satellite and Terrestrial Systems*, ESA Press Release, Mar. 10, 2003, pp. 1-2.

Mark Long, *Wi-Fi Heads for the Stratosphere*, Nov. 25, 2002.

Found on the Internet: http://skvstation.com/presentation/Regulatory/sId003.htm, *Initial ITU Activities*, Regulatory Affairs [International], Mar. 7, 2003.

Found on the Internet: http://www.wired.com.news.wireless 0.1382,56961,00.html, *Bird? Plane? UFO? No, Stratellite*, 2003 Associated Press, pp. 1-3.

Found on the Internet: http://msnbc.com/news/891861, *DOD Turns to Commercial Satelllites*, Technology & Science, Mar. 27, 2003.

Naguib et al., *Capacity Improvement of Base-Station Antenna Arrays Cellular CDMA*, 1993 IEEE, pp. 1437-1441.

Dr. Joseph Pelton, *Space Segment Technologies for the 21st Century: Key Challenges for National Satellite Systems*, 1991 IEEE, pp. 1103-1107.

Wu et al., *A Broadband Wireless Access System Using Stratospheric Platforms*, 2000 IEEE Global Telecomunications Conference, pp. 225-230.

Winters, Jack H., "Signal Acquisition and Tracking with Adaptive Arrays in Wireless Systems," IEEE, pp. 85-88 (May 18, 1993).

http://www.geo-orbit.org/sizepgs/geodef.html, "Geostationary, LEO, MEO, HEO Orbits Including Polar and Sun-Synchronous Orbits with Example Systems and a Brief Section on Satellite History," May 27, 2008.

Kary, Tiffany, "Motorola Settles Iridium Unit's Creditor Claims (Update 5)," Bloomberg.com, Apr. 23, 2008.

Hesseldahl, Arik, "The Return Of Iridium," Forbes.com, Nov. 30, 2001.

Hua, Vanessa, "Globalstar Hangs On In Satellite Wireless," p. C-9 of the San Francisco Chronicle, Mar. 9, 2001.

http://en.wikipedia.org/wiki/Globalstar, Globalstar, May 27, 2008.

Gilder, G., *George Gilder's Telecosm*—The New Rule of Wireless, FORBES ASAP, Apr. 1993, pp. 96-109.

Gilder, G., *George Gilder's Telecosm* Auctioning the Airways, FORBES ASAP, Apr. 11, 1994, pp. 99-112.

Gilder, G., From Wires to Waves, FORBES ASAP, Jun. 5 1995, pp. 125-141.

Calhoun, G., *Digital Cellular Radio*, Artech House Inc. Feb. 1988, pp. 276-360 & 373-374.

Calhoun, G., *Wireless Access and the Local Telephone network*, Artech House Inc. May 1992, pp. 334-340.

Steele et al., Third Generation PCN and the Intelligent Multimode Mobile Portable, Jun. 19, 1993, pp. 147-152, Electronics Communication Engineering Journal.

Steele, "Mobile communication in the 21st century," Communications after AD2000 Mar. 1993, pp. 135-147.

Arndt G.D. et al., "Application of beam power technology to a space station," The National Telesystems Conference, IEEE Catalog #82CH1824-2, Nov. 7-10, Jan. 1982, pp. B2,4.1-B2.4.5.

Fulghum, "Helos, Aerostats to Push Meads Range," Aviation Week & Space Technology, Nov. 27, 1995.

Fulghum, "Balloons Studied for Intelligence Role," Aviation Week & Space Technology, Nov. 27, 1995, pp. 24-25.

Balloon and airship; excepted from Compton's Interactive Encyclopedia, copyright Feb. 1993, Feb. 1994.

Dane, "A New Balloon", Popular Mechanics; Feb. 1993; p. 106 (2 pages).

"Secret Message by Satellite," Popular Mechanics, Mar. 1993, p. 16.

Wilson, J., "Countdown Begins for Earth-Orbiting Balloons," Popular Mechanics, May 1997, p. 19.

Brown, D.A., "The Birth of Iridium," Popular Science, Mar. 1994, p. 63.

Mowry, "Blimps go head-to-head with satellites?," Satellite Communications Apr. 1988 p. 70.

Poe, "Sanswire 'Stratellite' positioned as wireless alternative," America's Network (May 2005), p. 18.

"Blue skies for broadband," Popular Science ( Mar. 2005), p. 30.

"Hughes may have to build inmarsat-p birds around odyssey patents," Mobile satellite news (Jul. 27, 1995), pp. 1-3.

Pelton, "Telecommunications for the 21$^{st}$ Century," Scientific American (Apr. 1998), pp. 68-73.

www.aeroenvironment.com/area-aircraft/unmanned.html (Aug. 8, 1998), "Unmanned air vehicles", pp. 1-2.

www.abcnews.com (Aug. 8, 1998),"New altitude record for prop plane," pp. 1-2.

"Who's who and what's happening," Forbes ASAP, pp. 139-141, Apr. 1995.

www.skystation.com, Launching the sky station platform, Feb. 1996.

HAPS—High Altitude Platform Stations, pp. 1-10, Jan. 1992.

Windle, "Airship is down-to-earth alternatives to satellites," The Sunday Times: Innovation (May 24, 1999), pp. 1-3.

Fulghum et al., "Air force prepares new UAV acquisitions, operations," Aviation week and space technology (Nov. 27, 1995) , pp. 52-54.

www.phillynews.com/inquirer/96/Oct/10/lifestyle/SATS10.html (Oct. 10, 1996), "An essential protocol known as TCP is keeping the Internet tied to Earth," pp. 1-2.

www.phillynews.com/tech.life/DUDE10.htm, "Satellites may speed links to Internet," pp. 1-2, Apr. 1996.

www.hotwired.com/wired_online/4.09/skystation/index.html, "Space Case," Sep. 29, 1996, pp. 1-2.

www.hotwired.com/wired/4.09/es.sky.html, Electrosphere, "Space Case" Sep. 29, 1996, pp. 1-5.

www.cnn.com, "Solar-powered plane scrapes the edge of space," Aug. 7, 1998, pp. 1-3.

Ashley, "The rupture of Earth's ozone shield has become a global concern. But how can scientists gain the high-altitude data they need to find solutions? This unmanned power glider might be the answer," Popular Science (Jul. 1992), pp. 60-64.

Scott, "Relay aircraft enable cell 'Network in the Sky,'" pp. 22-23, Aviation Week & Space Technology (Jun. 29, 1998).

"International Balloon Federation," NY Times Article (Jun. 7, 1994), p. 1.

Browne, "Balloon teams vie to be first around world" The New York Times (Jun. 7, 1994).

"Perseus Prototype Flies," (Popular Mechanics Mar. 1992), p. 14.

"Powerbeamed drone aims for the stratosphere," Popular Mechanics (Apr. 1992), p. 21.

www.geo.arc.nasa.gov/ERAST/pathfinder/index.html, "Pathfinder"(Aug. 8, 1998).

Brayer, "Packet switching for mobile earth stations via low-orbit satellite network," Nov. 1994, vol. 72, No. 11, Proceedings of the IEEE.

Golden, "Exploring space on the cheap," Time (Nov. 23, 1998).

Brown, "The eternal airplane," Popular Science (Apr. 1994).

Hardy, "Highflying angel sees market in the sky for delivering data," The wall street journal interactive edition (Dec. 24, 1997), pp. 1-4.

"From mother to daughter: 832 watts," Popular Science (Oct. 1993), p. 26.

"Huge balloon proposed to launch astronomy instruments," CNN Interactive (Dec. 22, 1997), pp. 1-4.

"Superpressure balloon material selection process," Winzen, pp. 1-3, Jun. 1995.

"Superpressure stratospheric vehicle test and development," Winzen, pp. 1-7, Jul. 1995.

Application of sky station international, Inc. for authority to construct deploy and operate a global stratosheric telecomunications system, Before the Federal Communications Commission, Mar. 20, 1996.

"Sky station mobile broadband communications at 2GHz," pp. 1-2, Sky Station International Inc. (Jul. 9, 1998).

www.skystation.com/service.html, "Telecommunication Service Characteristics," Sky Station International Inc. (Oct. 1, 1998), pp. 1-2.

"Sky station broadband communications at 47GHz," Sky Station International Inc. (Jul. 9, 1998), pp. 1-2.

"Sky station Africa," Sky Station International Inc. Jul. 1998.

"Sky station platform technical summary," Sky Station International Inc. (Jul. 2, 1998), pp. 1-3.

www.skystation.com/faq/index.html, "Frequently Asked Questions," Sky Station International Inc., pp. 1-3, Jul. 1998.

www.skystation.com/sts.html, "The Technology: Stratospheric Telecommunications service," Sky Station International Inc., pp. 1-2, Jul. 1998.

"The Stratosphere," Sky Station International Inc. (Jul. 22, 1998), pp. 1-2.

"The Future of Communications is Up in the Air . . . Where it Belongs," Sky Station International Inc. (Jun. 1, 1998), pp. 1-6.

www.skystation.com/telecomreports.html, "Press Release," Sky Station International Inc. (Mar. 31, 1998), pp. 1-3.

vvww.telecomn.com/english/china/PS5_20001.htm, Youshou, "Prospects for future stratospheric communications system," Feb. 5, 2001.

Letter from Wizen International to Sherwin I. Seligsohn, dated Sep. 13, 1993 enclosing Final report dated Jun. 11, 1993.

Poe, "Drag coefficient for streamlined bodies, etc.," Nov. 4, 1996.

Lory, "HI-SPOT, Conceptual Design Study Final Report,", Lockheed Missiles & Space Company, Inc. (Mar. 1982), pp. 1-73.

\* cited by examiner

SUB-ORBITAL, HIGH ALTITUDE COMMUNICATIONS SYSTEM

CROSS-REFERENCE TO RELATED APPLICATIONS

This application is a continuation of prior application U.S. Ser. No. 10/180,892 filed Jun. 25, 2002, now abandoned which is a continuation application of U.S. Ser. No. 09/340,260 filed Jun. 30, 1999, (now abandoned), which is a continuation application of U.S. Ser. No. 08/929,752 filed Sep. 15, 1997 (now abandoned), which is a continuation application of U.S. Ser. No. 08/661,836 filed Jun. 11, 1996 (now abandoned), which is a continuation application of U.S. Ser. No. 08/100,037 filed Jul. 30, 1993 (now abandoned), incorporated herein by reference.

FIELD OF THE INVENTION

This invention relates to a communication system, and more particularly to a communications system that is operative at the sub-orbital level yet well above any system which is connected to the ground.

BACKGROUND OF THE INVENTION

Long distance telecommunications systems currently use space satellite transmission or ground based systems that rely upon towers, tall buildings, tethered balloons and the like.

Satellite systems have been used for many years with a high degree of reliability. They are particularly advantageous since due to their altitude one satellite can send and receive signals from an area encompassing hundreds of thousands of square miles. However, satellites are expensive to manufacture and are expensive to launch and place in position. Further, because of the costs associated with their manufacture and launch, and the great difficulty in servicing them, extraordinary care must be taken to assure their reliability. Notwithstanding this, when a satellite fails, as assuredly they all—must do, either electronically, or by degradation of orbit, substantial expense is incurred in replacing it and the equipment it carries.

Ground based systems do not have the high costs that are associated with satellite systems. However, because they are low, a particular relay station may only be able to send and receive signals over a few hundred square miles. Thus, to cover a large area, many such relay stations must be provided. Further, ground based systems suffer from line-of-sight problems in that mountains, tall trees, tall buildings and the like interfere with the propagation of telecommunications signals. Still further, it may not be possible to install a telecommunications relay station at a particular site where one is needed due to geographic or political factors, or merely because of the inability to obtain permission from a land owner or government.

To some extent these problems are alleviated by using tethered balloons. However, tethered balloons are subject to the atmospheric conditions that exist at lower altitudes and are likely to be damaged as they are subject to weather conditions thereby requiring frequent replacement. Also, if they are flown at altitudes that enable them to relay telecommunications signals over a large enough area to make them economically feasible, the tethers become hazardous to aircraft.

It would be advantageous to provide a stable, long duration, telecommunications system which is based on a sub-orbital, high altitude device which has the ability to receive telecommunication signals from a ground station and relay them to another similar device or to a further ground station.

If the relay stations were made of high altitude, long duration lighter than air devices whose location could be controlled so as to be over a particular location on the earth, a means will have been created for providing relatively low cost telecommunication service such as a telephone service for remote areas without incurring the expense associated with satellite based communication systems, and without the disadvantages of a ground system or a tethered balloon system.

SUMMARY OF THE INVENTION

Accordingly, with the foregoing in mind the invention relates generally to a telecommunications system that comprises at least two ground stations. Each of the ground stations includes means for sending and means for receiving telecommunication signals. At least one relay station is provided. The relay station includes means for receiving and sending telecommunication signals from and to the ground stations and from and to other relay stations.

The relay stations are at an altitude of about 15 to 25 miles (i.e., within a portion of the stratosphere) and, thus, are capable of transmitting signals to a point on the earth directly below a relay station with a transmission time of about 80 μsec. Means are provided for controlling the lateral movement of the relay stations so that once a pre-determined altitude is reached, a predetermined location of each of the relay stations can be achieved and maintained.

BRIEF DESCRIPTION OF THE DRAWINGS

The invention can be further understood by referring to the accompanying drawing of a presently preferred form thereof, and wherein.

DETAILED DESCRIPTION

Figure 1:
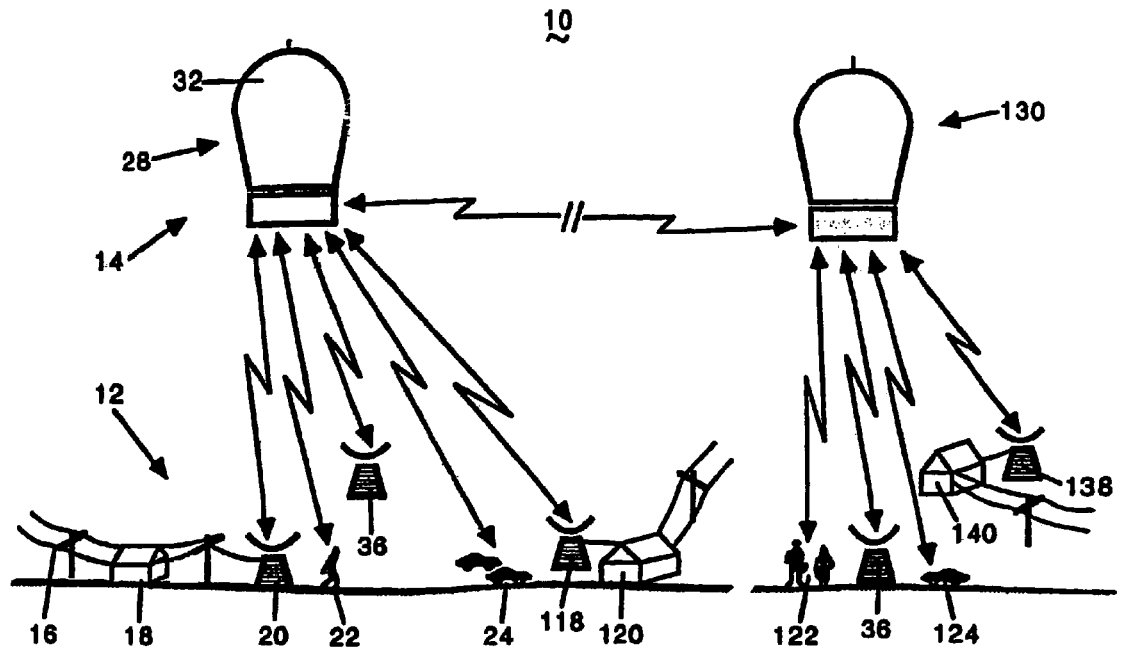
FIG. 1 is a schematic showing a communications system constructed in accordance with a presently preferred form of the invention.

Referring now to FIG. 1, the system 10 comprises a ground based portion 12 and an air based portion 14.

The ground based portion 12 may comprise conventional telephone networks 16 with branches that are connected to a ground station 18 having suitable long distance transmitting and receiving means such as antenna 20. The ground based portion 12 may also comprise mobile telephones of well known types such as cellular telephones that may be carried by individuals 22 or in vehicles 24. The microwave antennae 20 are operative to transmit and receive a telecommunication signal to and from a sub-orbital, high altitude relay station 28 which is located at an altitude of between about 15 to 25 miles.

Preferably, there are a plurality of relay stations 28; each one being at a fixed location over the earth.

Each relay station 28 contains means for receiving a telecommunication signal from a ground station 20, individual 22 or vehicle 24 and then transmitting it to another ground station 118, individual 122 or vehicle 124 either directly or by way of another relay station 130. Once the signal returns to the ground based portion 12 of the system 10, the telecommunication call is completed in a conventional manner.

The relay station 28 may comprise a lighter than air device 32. A suitable device could be an inflatable device such as a high altitude super-pressure balloon of the type developed by Winzen International, Inc. of San Antonio, Tex. The super-pressure balloon 32 is configured so that it floats at a predetermined altitude. The configuring is accomplished by balancing inflation pressure of the balloon and the weight of its payload against the expected air pressure and ambient temperatures at the desired density altitude. It has been observed that devices of this character maintain a high degree of vertical stability during the diurnal passage notwithstanding that they are subject to high degrees of temperature fluctuation.

A plurality of tracking stations 36 are provided. The tracking stations include well known means which can identify a particular relay station 28 and detect its location and altitude.

As will be explained, a thrust system is provided for returning a relay station 28 to its pre-assigned location should a tracking station 36 detect that it has shifted.

Figure 2:
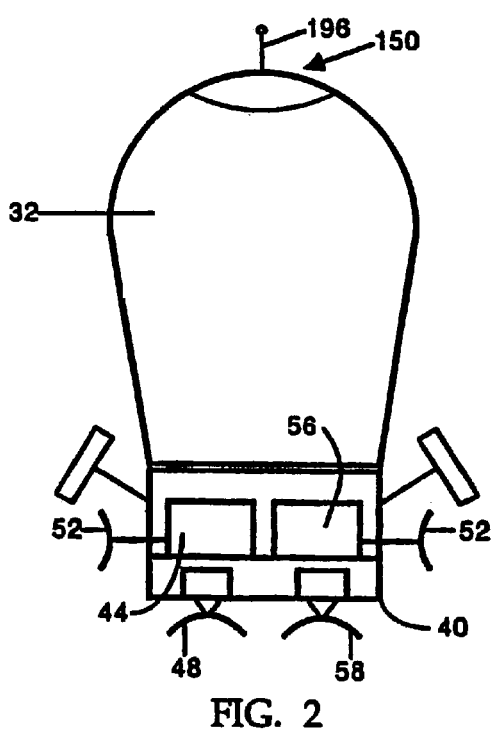
FIG. 2 is a side elevation view of one of the relay stations comprising the invention.

Referring to FIG. 2, each of the relay stations 28 includes a housing 40 which is supported by device 32. The housing 40 contains a telecommunication signal transmitter and receiver 44 and a ground link antenna 48. Antenna 48 is for receiving and sending telecommunications signals between ground stations 20 and the relay station 28. The relay station 28 also includes a plurality of antennas 52 which are adapted to receive and transmit telecommunications signals from and to other relay stations. The housing 40 also contains a guidance module 56 that transmits the identity and location of the relay station to the tracking stations 36. It receives instructions from the tracking station for energizing the thrust system. A guidance antenna 58 is provided to enable communication between the tracking station 36 and the guidance module 56.

A suitable re-energizable power supply Go is mounted on housing 40, the power supply 60 may comprise a plurality of solar panels 64. In a well known manner the solar panels capture the sun, s light and convert it into electricity which can be used by the telecommunications equipment as well as for guidance and propulsion.

In addition the power supply could also comprise a plurality of wind vanes 68. The wind vanes may be arranged to face in different directions so that at least some of them are always facing the prevailing winds. The wind vanes 68 can be used to generate electric power in a well known manner which also can be used by the telecommunication equipment as well as for guidance and propulsion.

Figure 4:
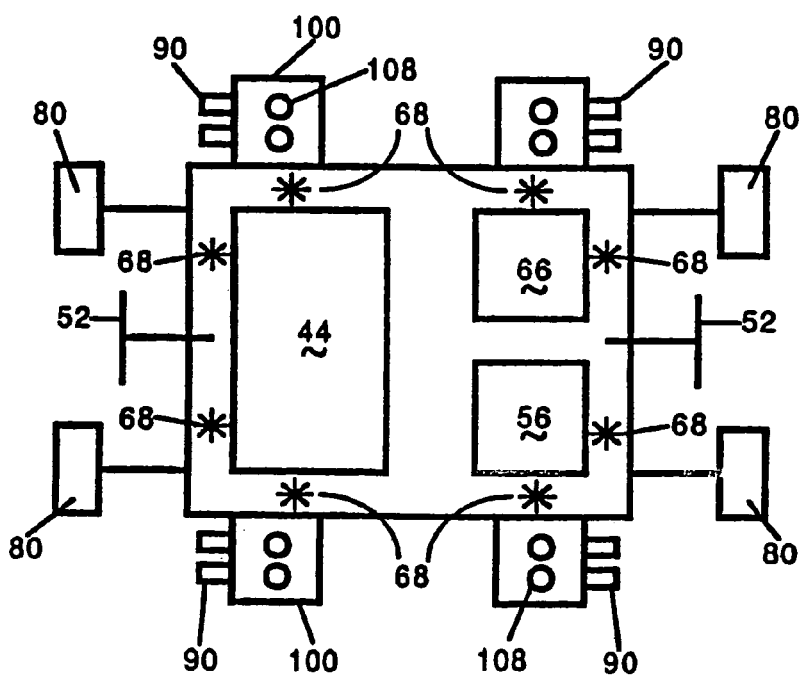
FIG. 4 is a view of a portion of FIG. 2 showing another form of propulsion system.

As seen in FIG. 4, an alternate power supply 66 may be provided in the form of a microwave energy system of similar to that which has been developed by Endosat, Inc. of Rockville, Md. The microwave energy system includes a ground based microwave generator (not shown) that creates a microwave energy beam of about 35 GHz. This beam is directed to receptors 80 on the relay 28 and there converted to direct current.

In a manner similar to the solar energy system, the microwave energy system could supply power sufficient to operate the telecommunications system on the relay station as well as provide power for guidance and propulsion. Further, the relay stations 28 may be provided with at least one microwave transmitter and suitable means for aiming the microwave transmitter at a microwave receiving means on another relay station 28 so that a source other than the ground based microwave generator is available to provide microwave energy to the relay stations.

Figure 3:
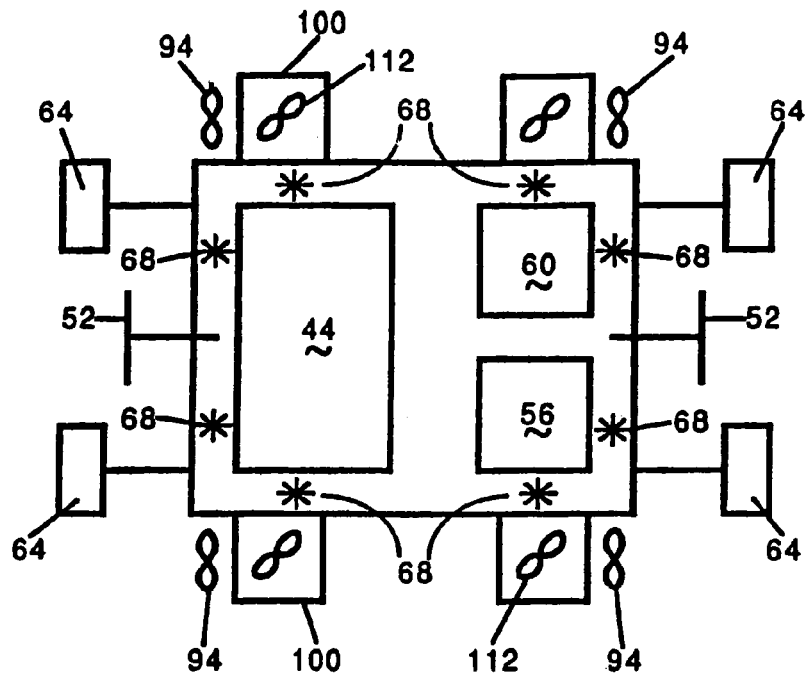
FIG. 3 is a view of a portion of FIG. 2 showing a propulsion system.

As seen in FIGS. 3 and 4 the navigation/thrust system for the relay station 28 may comprise a plurality of rockets or jets 90 or propellers 94. The jets 90 and propellers 94 are arranged in a horizontal plane along mutually perpendicular axes which are supported by pods 100 on the housing 40. By selective energization of various ones of the jets or propellers the relay station 28 can be directed to and maintained at a pre-determined location over the earth.

If desired, additional jets or rockets 108 or propellers 112 could be located on vertical axes to assist in bringing the relay station to its predetermined altitude on launch or restoring it should its drift from that altitude be more than an acceptable amount.

The tracking stations 36 and guidance module 56 are operative to energize selected ones of the jets or propellers for selected intervals to return the relay stations 28 to their pre-determined locations.

When the system 10, is operating the customer will be unaware of its existence. Thus, when a call is placed, the telecommunications signal will be conveyed from the caller's telephone by way of a conventional network to the ground station 18 associated with that location. The microwave antenna 20 will then beam a telecommunications signal corresponding to that telephone call to the nearest relay station 28. Switching circuity of a well known type will direct the signal to another ground station 120 near the recipient. If the recipient is further, the signal will be sent to a further relay station 130 from which it will be directed to a mobile telephone carried by an individual 122 or in a vehicle 124 or to a ground station 140 near the recipient. The signal received by the ground station 120 or 140 will be transmitted to the recipient's telephone by way of a conventional telephone network. once a communication link is established between two telephones by way of the ground stations and relay stations, the parties can communicate.

Drifting of the relay stations 28 from their pre-determined locations will be detected by the tracking stations 36. The tracking stations 36 will then energize the thrust members on the relay stations 28 to return them to their pre-determined locations.

As best seen in FIGS. 2, 5, 6 and 7 a recovery system 150 for the relay stations 28 is provided. As will be more fully explained, the recovery system includes a deflation device 152 and a remote controlled recovery parachute 154.

Figure 5:
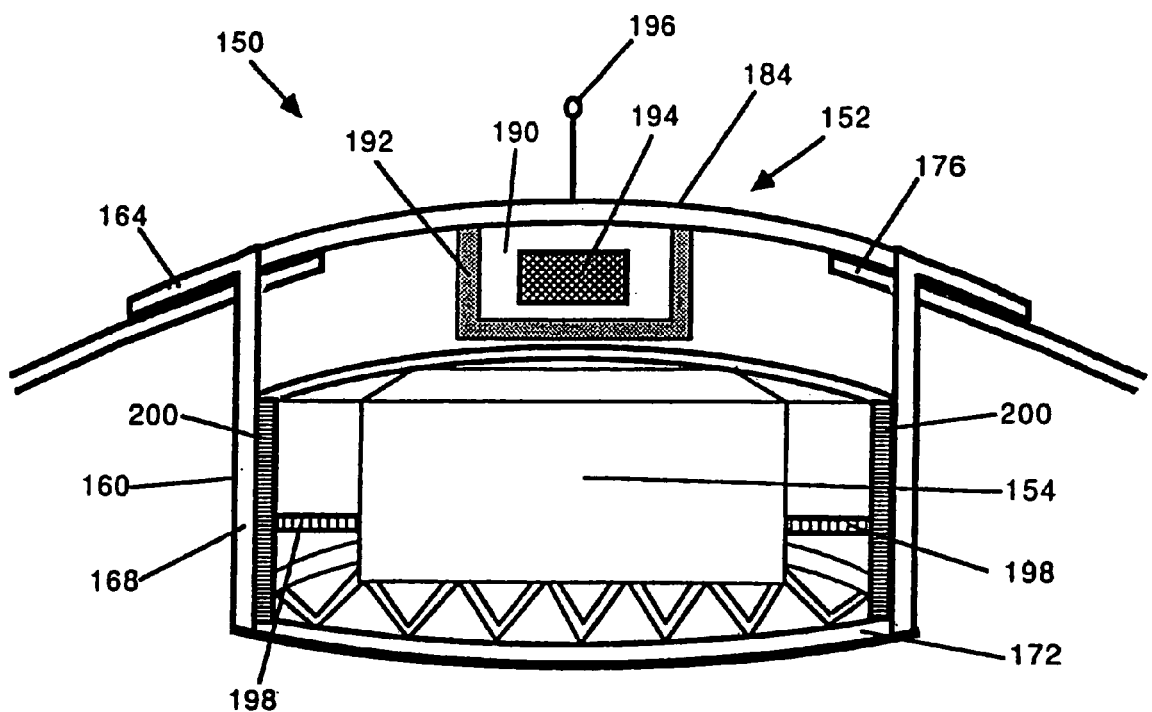
FIG. 5 is a view of a portion of a relay station.

Referring to FIGS. 2 and 5 one embodiment of the deflation device 152 includes a housing 160 that is formed integrally with the suitable lighter than air device 32. The housing 160 includes an outwardly extending and radially directed flange 164 that is integrally connected to the device 32 as by welding or by adhesive. The flange 164 supports a downwardly directed, and generally cylindrical wall 168 that supports a bottom wall 172. As seen in FIG. 5, the bottom wall 172 is defined by an open lattice so that the housing 160 is connected to the interior of the device 32 and is at the same pressure.

Near its upper end the cylindrical wall 168 supports an inwardly directed flange 176. A frangible cover 184 is connected to the flange in airtight relation. This can be accomplished by connecting the cover to the flange by an adhesive, or with a suitable gasket between them, or by fabricating the cover as an integral part of the housing 160.

The cylindrical wall 168, bottom wall 172 and cover 184 define a chamber that contains the remote control recovery parachute 154.

A small chamber 190 is formed on the underside of the cover 184 by a wall 192. A small explosive pack 194 which is contained within the chamber 190 is responsive to a signal received by antenna 196.

The parachute 154 has its control lines 198 connected to a radio controlled drive member 200 that is contained within the housing 160. The drive member 200 may include electric motors that are driven in response to signals from the ground to vary the length of the control lines in a well known manner to thereby provide directional control to the parachute.

To recover the relay station a coded signal is sent to the device where it is received by antenna 196. This results in the explosive charge 194 being detonated and the frangible cover 184 being removed.

Since the cover 184 is designed to break, the explosive charge can be relatively light so that it does not damage the parachute 154.

In this regard the wall 192 helps to direct the explosive force upwardly against the cover rather than toward the device 32.

After the cover has been removed, the gases will begin to escape from the interior of the device 32 through bottom wall 172 and the opening in the top of the housing. The force of air exiting from the device 32 when the cover is first removed will be sufficient to deploy the parachute.

Figure 7:
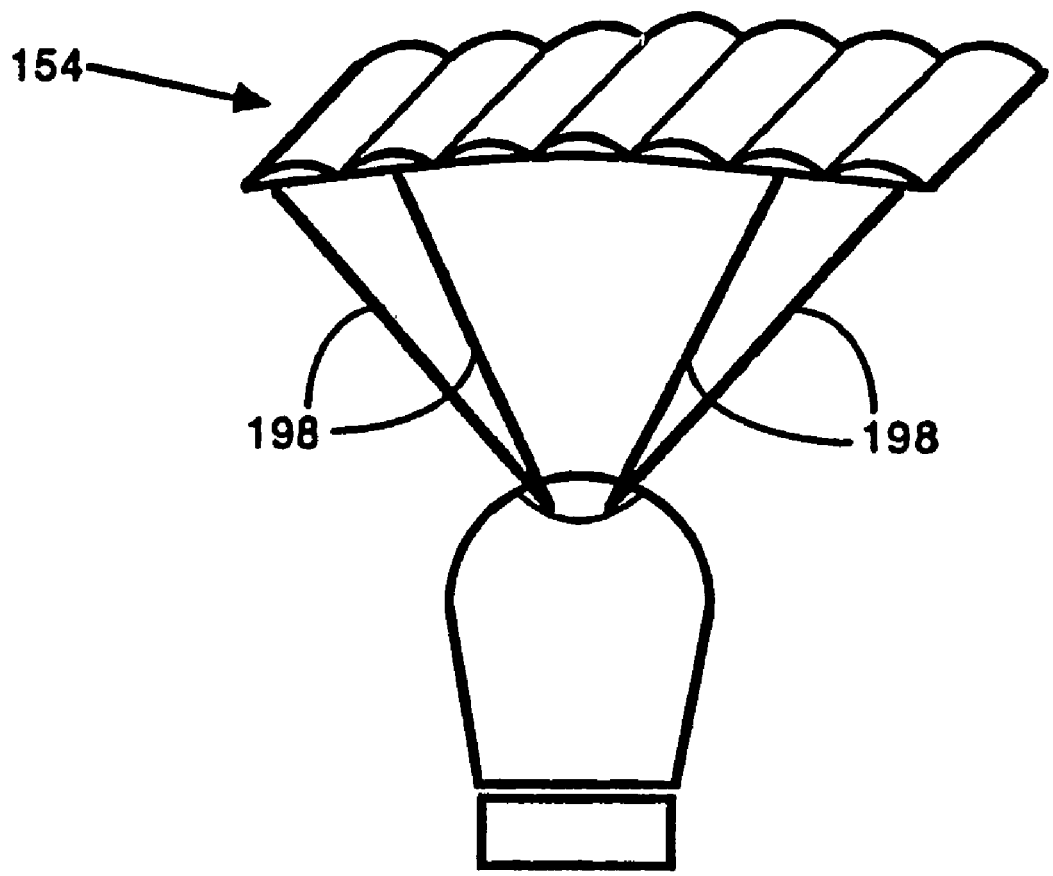
FIG. 7 is a view of a relay station being recovered.

As seen in FIG. 7, the parachute 154 will support the device 32 by way of its control lines 198. As explained above, the relay station 28 can be directed to a predetermined location on the ground.

Figure 6:
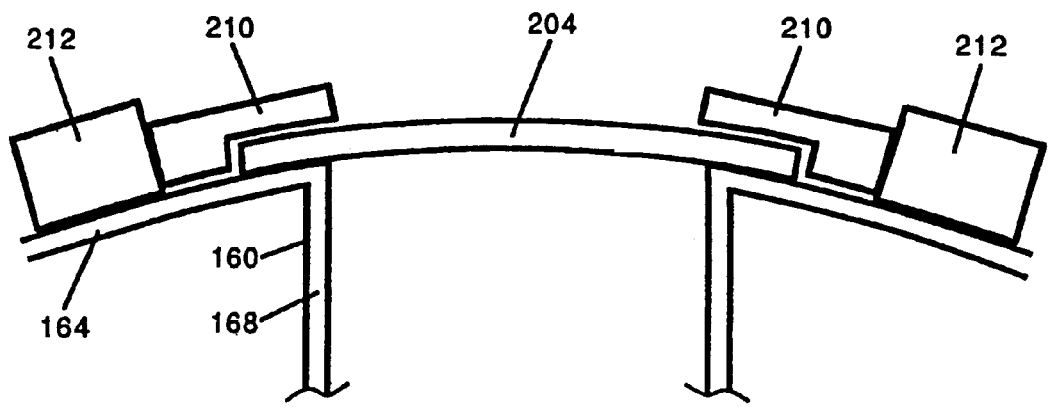
FIG. 6 is a view of a second embodiment of the portion of the relay station shown in FIG. 5.

In the embodiment shown in FIG. 6 flange 164 supports cover 204 with an annular airtight gasket between them. The cover 204 is held against the flange 164 by a plurality of circumferentially spaced clamping brackets 210. The clamping brackets are retractably held in engagement with the cover 204 by electrically driven motors 212. The motors are energized in response to signals from the ground to retract the brackets 210.

When the brackets 210 are retracted, the pressure of the gases escaping from the device 32 will dislodge the cover and permit the parachute to be deployed.

After the relay station has been serviced, the recovery system 150 can be replaced and the device 32 can be re-inflated and returned to the service.

While the invention has been described with regard to particular embodiments, it is apparent that other embodiments will be obvious to those skilled in the art in light of the foregoing description. Thus, the scope of the invention should not be limited by the description, but rather, by the scope of the appended claims.

What is claimed is:

1. A telecommunications apparatus comprising:
at least two ground stations, each of the ground stations including means for transmitting and receiving telecommunications signals; and
at least one relay station, the relay station including means for transmitting and receiving telecommunications signals from and to the ground stations and from and to other relay stations, the relay station being disposed at a predetermined altitude within a portion of the stratosphere, the relay station being at a fixed predetermined location over the earth for transmitting and receiving telecommunications signals from and to the ground stations and from and to the other relay stations, the relay station further including means for controlling the vertical and lateral movement of the relay station so that, if the relay station moves from the predetermined altitude and fixed predetermined location, the relay station is moved back to the predetermined altitude and fixed predetermined location within the portion of the stratosphere;
wherein the relay station is lighter than air;
wherein the relay station further includes an inflatable device and means connected to the inflatable device for deflating it while it is aloft; and
wherein the means for deflating the inflatable device includes: an opening in the inflatable device; a frangible cover forming part of an inflatable portion of the inflatable device covering and closing the opening and being operative to seal the opening against the escape of gases from the inflatable device; and an explosive charge operative when detonated to remove the frangible cover from the opening.

2. A telecommunications apparatus comprising:
at least two ground stations, each of the ground stations including means for transmitting and receiving telecommunications signals; and
at least one relay station, the relay station including means for transmitting and receiving telecommunications signals from and to the ground stations and from and to other relay stations, the relay station being disposed at a predetermined altitude within a portion of the stratosphere, the relay station being at a fixed predetermined location over the earth for transmitting and receiving telecommunications signals from and to the ground stations and from and to the other relay stations, the relay station further including means for controlling the vertical and lateral movement of the relay station so that, if the relay station moves from the predetermined altitude and fixed predetermined location, the relay station is moved back to the predetermined altitude and fixed predetermined location within the portion of the stratosphere;
wherein the relay station is lighter than air;
wherein the relay station further includes an inflatable device and means connected to the inflatable device for deflating it while it is aloft; and
wherein the means for deflating the inflatable device includes: an opening in the inflatable device; a dislodgeable cover covering and closing the opening against the escape of gases from the inflatable device; and a plurality of clamping brackets for releasably retaining the cover in sealing relation with the opening; and further comprising: at least one electrically driven motor supported by the inflatable device, the electrically driven motor being in engagement with the clamping brackets and being operative when energized to move the clamping brackets so that they release the cover from the opening, air pressure in the inflatable device dislodging the cover upon movement of the clamping brackets.

3. The apparatus according to claim 1, further comprising a housing integral with the inflatable device and disposed within the opening, an interior of the housing communicating with an interior of the inflatable device but being sealed off from the atmosphere by the cover.

4. The apparatus according to claim 3, wherein the housing contains a parachute.

5. The apparatus according to claim 3, wherein the housing contains an explosive material.

6. The apparatus according to claim 5, wherein the housing further contains a shield between the housing and the explosive material, the explosive material between the shield and the cover, the shield configured to direct explosive force generated by the explosive material out through the hole away from the inflatable device.

7. The apparatus according to claim 2, further comprising a housing integral with the inflatable device and disposed within the opening, an interior of the housing communicating with an interior of the inflatable device but being sealed off from the atmosphere by the cover.

8. The apparatus according to claim 2, wherein the housing contains a parachute.

9. The apparatus according to claim 2, wherein the housing contains an explosive material.

10. The apparatus according to claim 9, wherein the housing further contains a shield between the housing and the explosive material, the explosive material between the shield and the cover, the shield configured to direct explosive force generated by the explosive material out through the hole away from the inflatable device.

* * * * *